United States Patent [19]

Kennedy et al.

[11] 4,362,007
[45] Dec. 7, 1982

[54] CUTTING HEAD ASSEMBLY FOR A ROTARY MOTOR

[76] Inventors: Merrill V. Kennedy, 6560 N. Harbor City Blvd., Melbourne, Fla. 32935; Howard E. Richards, 1347 S. Patrick Dr., Satellite Beach, Fla. 32937

[21] Appl. No.: 276,893

[22] Filed: Jun. 24, 1981

[51] Int. Cl.³ .......................................... A01D 55/18
[52] U.S. Cl. ................................................... 56/295
[58] Field of Search ...................... 56/12.7, 295, 13.4

[56] References Cited

U.S. PATENT DOCUMENTS

| | | | |
|---|---|---|---|
| 3,176,455 | 4/1965 | Buchanan | 56/295 |
| 3,690,051 | 9/1972 | Wood | 56/295 |
| 4,065,913 | 1/1978 | Fisher | 56/12.7 |
| 4,112,653 | 9/1978 | Ballas | 56/295 |
| 4,295,324 | 10/1981 | Frantello et al. | 56/12.7 |

Primary Examiner—Jay N. Eskovitz
Attorney, Agent, or Firm—Duckworth, Allen, Dyer and Pettis

[57] ABSTRACT

A cutting head assembly for a rotary motor is disclosed characterized by a flat disc member having a plurality of holes which are provided with a leading edge. A plurality of radially disposed holes are provided for insertion of a monofilament line which is the cutting element. A bar support is provided to prevent the accidental dislodging of the monofilament line.

4 Claims, 11 Drawing Figures

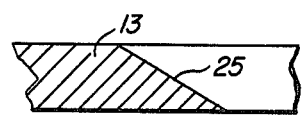
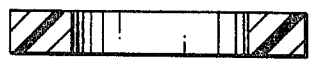
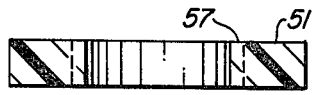
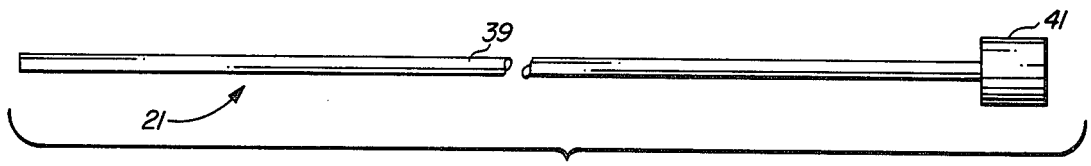
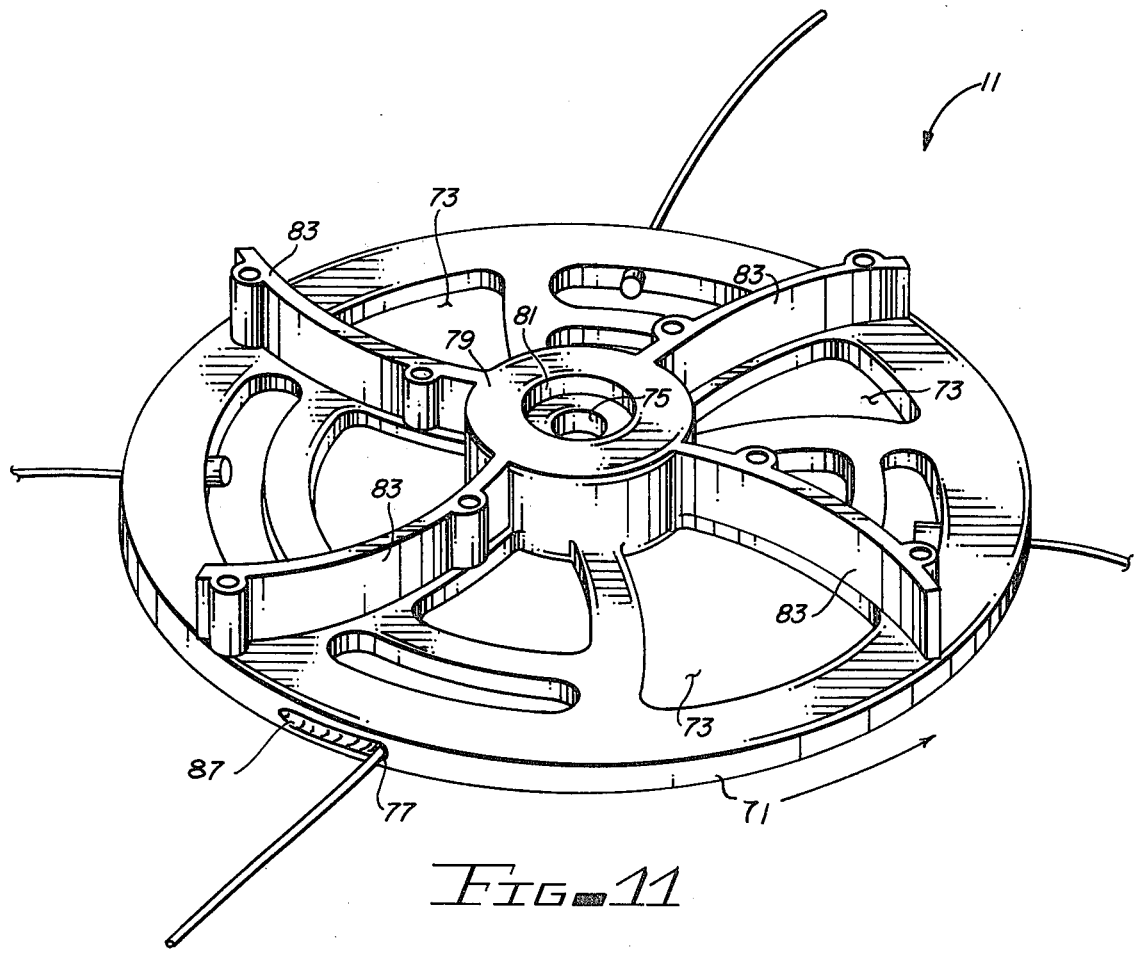

CUTTING HEAD ASSEMBLY FOR A ROTARY MOTOR

BACKGROUND OF THE INVENTION

This invention pertains generally to cutting elements for rotary motors, and more particularly to a safe cutting head assembly utilizing monofilament elements to provide the cutting action.

Most rotary motors now in existance utilize a blade as a cutting element. The biggest disadvantage with the use of a blade is its inherent dangerous qualities when in operation. Numerous accidents which have resulted in the amputation of fingers and feet have occurred because of the use of such a blade. Another disadvantage of the rigid metal blades is that it picks up objects and propels them at high speeds which a resulting risk on injury.

Certain improvements have been made in an attempt to reduce the disadvantages of and dangers inherent in the use of a blade. One such improvement utilizes a hub having a plurality of equal distantly spaced arms, each carrying a boss having a bore which extends therethrough. A flexible cutting line is disposed in the longitudinal bores of each of the bosses and projects therefrom into proximity with the interior of a housing of a rotary power mower. One of the disadvantages with this type of device is that it does not altogether eliminate the dangers which are also present with the use of the blade. Specifically, the use of the radially extending arms significantly duplicate the dangers inherent in a blade. Additionally, one of the disadvantages is that the monofilament has a tendency to be dislodged when any centrifugal force is exerted upon it such as movement of the rotary mower when it is not in operation.

BRIEF SUMMARY OF THE INVENTION

The disadvantages attendent to the devices known in the prior art are overcome in the present invention by the use of a circular disc having a rounded periphery and having a plurality of longitudinally extending apertures provided with a leading edge; and a plurality of radially extending apertures adapted to accommodate a monofilament line. A distinct member is disposed adjacent to each of said radially disposed holes and intermediate between said holes and the center of the disc so as to prevent accidental dislodgement of the monofilament when a lawn mower is transported.

BRIEF DESCRIPTION OF THE DRAWINGS

Further details are explained below with the help of the examples illustrated in the attached drawings in which:

FIG. 3 is a cross sectional view across 3—3 in FIG. 1;

FIG. 4 is a side view of the monofilament element used in conjunction with the device of FIG. 1;

FIG. 6 is a cross sectional view of the washer of FIG. 5;

FIG. 8 is a cross section of FIG. 7;

FIG. 10 is a cross section of FIG. 9; and

FIG. 11 is a perspective view of an alternate embodiment of the cutting head assembly.

DETAILED DESCRIPTION OF THE PREFERRED EMBODIMENT

Figure 1:
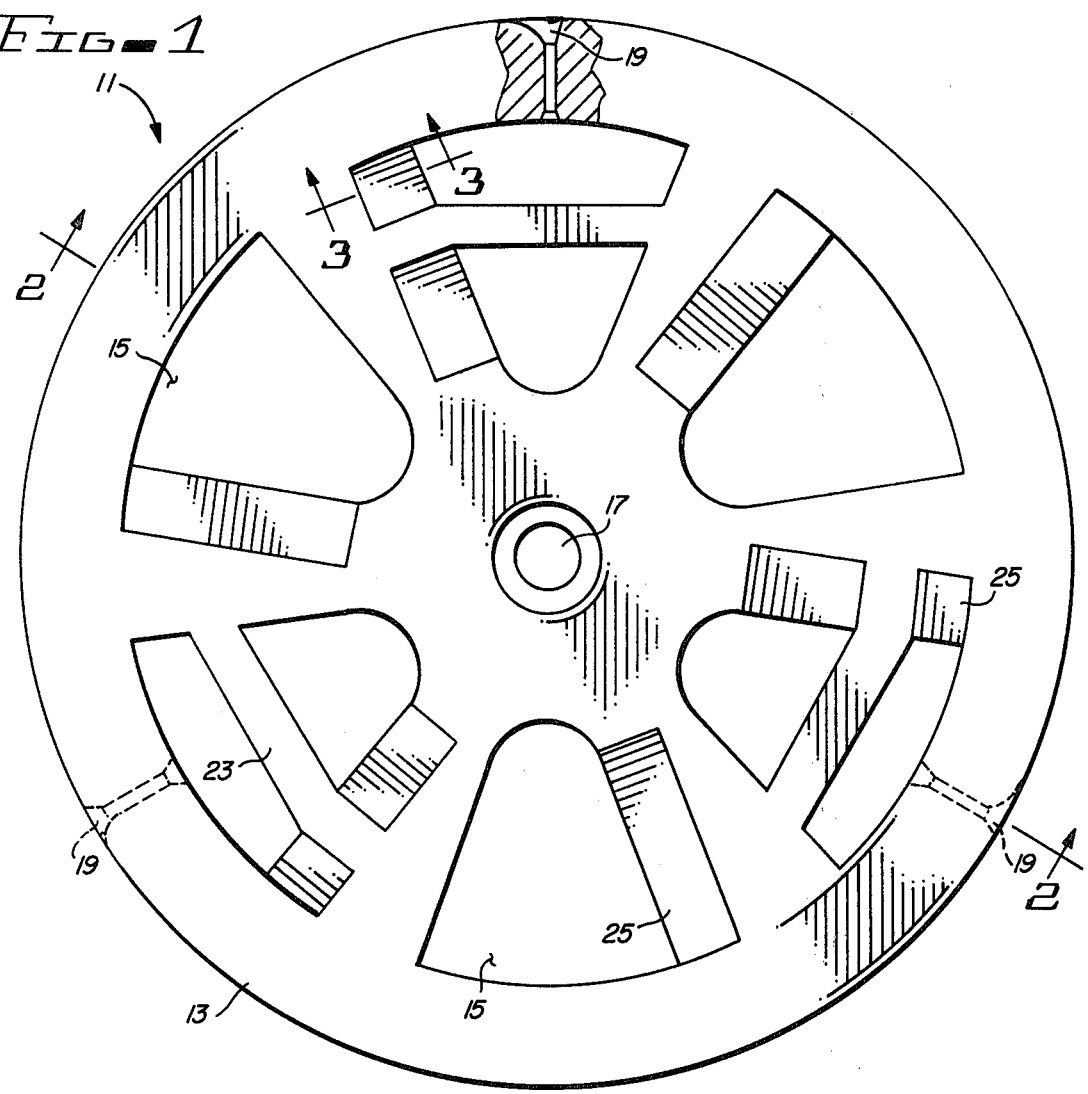
FIG. 1 is a top view of the circular cutting head assembly using a flexible monofilament line according to the present invention.

Illustrated in FIG. 1 is a circular cutting head assembly generally denoted 11 made in accordance with the present invention. The cutting head assembly comprises a circular disc 13 which may be made of metal such as aluminum or more preferable of molded plastic. The circular disc 13 is provided with a plurality of longitudinally extending openings or cutouts 15 symmetrically disposed about a center 17 of the disc 13. A plurality of radially disposed holes 19 are provided, preferably extending from the inside periphery of one of the cutouts 15 to the outer periphery of the circular disc 13. The diameter of the radially extending hole 19 is sufficiently great to freely accommodate a monofilament element 21, best illustrated in FIG. 3. A restraining member 23 is disposed adjacent to and in between each radially extending hole 19 and the center 17. The restraining member 23 provides a stop for the monofilament element 21. Thus, if any centrifugal force is accidentally exerted on monofilament element 21, restraining member 23 will prevent the dislodgement of the monofilament 21. Each cutout 15 is additionally provided with a leading edge 25 which is designed to create an updraft to maintain the grass erect and also to aid in the discarding of the cut grass.

Figure 2:
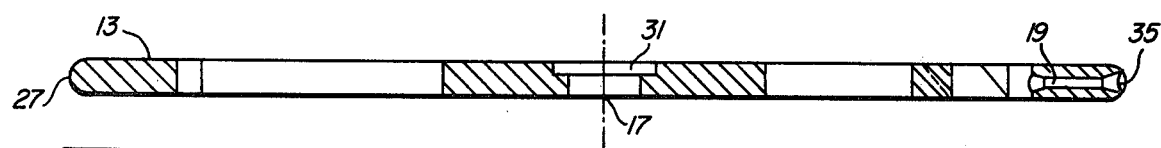
FIG. 2 is a cross sectional view of FIG. 1.
Figure 5:
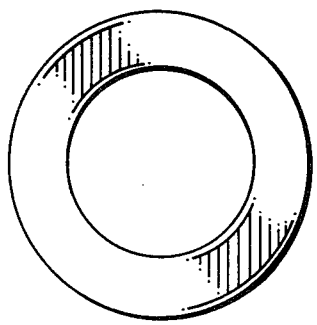
FIG. 5 is a top view of a washer used in conjunction with the invention.
Figure 7:
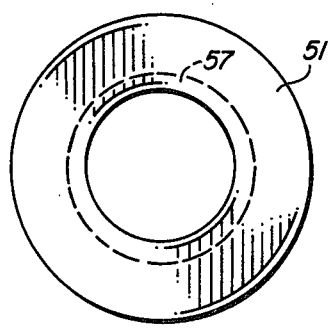
FIG. 7 is a top view of a washer with a knock-out member to be used in conjunction with the present invention.
Figure 9:
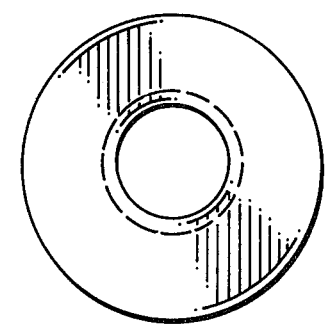
FIG. 9 is a top view of a third washer which can be used in conjunction with the invention.

As better illustrated in FIG. 2, circular disc 13 has a rounded periphery 27. Center 17 is provided with a hole 29 preferably 0.625 inches diameter, and a counterbore 31 of approximately one inch diameter and depth of 0.125 inches. As also illustrated in FIG. 2, the longitudinal hole 19 is provided with a tapered portion 33 and a tapered portion 35 at the outer periphery of the disc 13. Illustrated in FIG. 3 is a cross section 3—3 on FIG. 1, which illustrates the sharp leading edge 25 which is provided for each cutout 15.

Illustrated in FIG. 4 is the monofilament line 21 which comprises an elongated filament 39 and a head portion 41 of larger diameter than the elongated portion 39. The elongated portion 39 of the monofilament element 21 is adapted to be inserted into hole 19 and enabled to rotate freely thereon. The head 41 prevents the monofilament element 21 from being dislodged under centrifugal exceleration due to the rotation of the disc 13. The restraining elememnt 23 is provided so that the head portion 41 of the monofilament element 21 prevents substantial displacement towards the center.

As illustrated in FIGS. 5-10, the cutting head assembly 11 can be adapted to the various types of rotary mowers by using a number of plastic washers 51 which may be provided with a knock-out section 57. These washers are adapted to be inserted into the countersunk portion 31. The washers may be made of polyvinyl material or any other plastic with similar characteristics.

In operation the disc 13 is installed on the main shaft of a rotary mower. The disc 13 is rotated at sufficient speed so that the leading edges 25 create an updraft which would tend to maintain the grass in an upright position. The monofilament element 21 will be rotated at high speeds and will cut the grass upon impact. The cutting head assembly is safe in that the monofilament element 21 is sufficiently flexible so that upon impact with a hand or any other pendage of a body no significant injury will occur. The disc configuration is additionally safe in that it has a closed periphery unlike other monofilament assemblies known.

FIG. 11 is a perspective view of an alternate embodiment of the cutting head assembly 11. The embodiment illustrated in FIG. 11 includes a circular disc 71 substantially similar to the circular disc 13 of the embodiment in FIG. 1. The circular disc 71 is provided with a plurality of longitudinally extended openings or cut-outs 73 symmetrically disposed about a center 75 of the disc 71. A plurality of radially disposed holes 77 are provided, preferably extending from the inside periphery of one of the cut-outs to the outer periphery of the circular disc 71. A center hub 79 is provided having an opening 81 which is concentric with the center 75 of the disc 71 and accommodates the shaft of a rotary mower. A plurality of vanes 83 are disposed symmetrically in a substantially radial disposition and given some curvature to provide the necessary air flow to carry the cut grass into a bag.

Another important feature of the invention is that the periphery of the disc 71, at the location of holes 77, is provided with a "lay back" or recessed channel 87 having a smooth contour. The function of the recess is to relieve stresses on the filament 39, when the filament impacts an object. In FIG. 11 the direction of rotation of the disc 71 is indicated by an arrow. The "lay back" is shown oriented in an opposite direction from the direction of rotation. This "lay back" may also be used in the embodiment of FIG. 1.

I claim:

1. A rotary mower cutting head assembly comprising:
   a disc having a smooth closed periphery, a plurality of longitudinally extending openings, and a plurality of radially extending openings;
   a plurality of monofilament elements having an elongated portion and a wider head portion, said monofilament elements adapted to be inserted into the radial openings on said disc;
   a smooth contour channel disposed on the periphery of the disc at the radial openings;
   a plurality of retaining members disposed in between the radially extending openings and the center of the disc whereby inward travel of the monofilament element will be restricted; and
   a plurality of curved vanes disposed on said disc in a substantially radial position, whereby the vanes create an upward flow of air through the longitudinally extending openings.

2. The cutting head assembly of claim 1 wherein said disc is circular.

3. The cutting head assembly of claim 1 wherein said disc is molded out of a plastic material.

4. The rotary mower cutting head assembly of claim 1 wherein said plurality of monofilament elements comprises four monofilament elements disposed at 90° interval relative to the center of said disc.

* * * * *